United States Patent
Fitzgerald et al.

(10) Patent No.: US 8,347,145 B2
(45) Date of Patent: Jan. 1, 2013

(54) SYSTEM AND METHOD FOR PROVIDING A MISSION BASED MANAGEMENT SYSTEM

(75) Inventors: David J. Fitzgerald, Monument, CO (US); Eric S. Jensen, Colorado Springs, CO (US); Daniel P. Lindorf, Colorado Springs, CO (US); Scott E. Sage, Colorado Springs, CO (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1638 days.

(21) Appl. No.: 11/033,753

(22) Filed: Jan. 13, 2005

(65) Prior Publication Data

US 2005/0262397 A1    Nov. 24, 2005

Related U.S. Application Data

(60) Provisional application No. 60/567,645, filed on May 4, 2004.

(51) Int. Cl.
*G06F 11/00* (2006.01)

(52) U.S. Cl. ........... 714/31; 714/38.1; 714/47.1; 714/48

(58) Field of Classification Search .................... 714/31, 714/38, 47, 48, 32, 38.1, 47.1, 481
See application file for complete search history.

(56) References Cited

U.S. PATENT DOCUMENTS

| | | | | |
|---|---|---|---|---|
| 5,944,784 A * | 8/1999 | Simonoff et al. | ............. | 709/203 |
| 6,151,688 A * | 11/2000 | Wipfel et al. | .................... | 714/48 |
| 6,219,805 B1 * | 4/2001 | Jones et al. | ..................... | 714/38 |
| 6,748,555 B1 * | 6/2004 | Teegan et al. | .................... | 714/38 |
| 7,548,897 B2 * | 6/2009 | Barrett et al. | ................... | 706/50 |

* cited by examiner

*Primary Examiner* — Charles Ehne
(74) *Attorney, Agent, or Firm* — Andrews Kurth, LLP

(57) ABSTRACT

An embodiment of the present invention may provide a method and system for event notification, performance and/or risk assessment based on mission impact that may be due to actual and/or potential info-structure disruptions. In one embodiment of the present invention, one or more network event messages may be received from a source or multiple sources. An operational mission impacted by a network event may be identified based on a received network event message and mapping with an operational architecture task identifier associated with the impacted operational mission and an element identifier associated with a source element.

30 Claims, 4 Drawing Sheets

SYSTEM AND METHOD FOR PROVIDING A
MISSION BASED MANAGEMENT SYSTEM

REFERENCE TO RELATED APPLICATION

This application claims the benefit of, and incorporates by reference, U.S. Provisional Application No. 60/567,645, filed May 4, 2004.

TECHNICAL FIELD

The present invention relates to monitoring and/or managing a network. In particular, an embodiment of the present invention provide an automated method for analyzing events by calculating and reporting operational impacts.

BACKGROUND OF THE INVENTION

One function of an operations center such as a network operations center is to report and/or manage network disruptions. Network management applications automate the reporting and/or management process to some extent. A common reporting methodology is to report link, node and application variations based on a threshold level. Furthermore, the performance reporting can be automatically directed to individuals or organizations via pager, email or other means. In one example, if the network is a data communications network, the reporting may be terms of network performance. Thus, the reports would indicate if a particular module or application is operative or inoperative, is operating above or below its operations capacity and/or is not responding. Network operations personnel are most comfortable reporting network disruptions in terms of this type of network impact.

Network impact information may or may not be helpful to network users in determining the impact a network disruption has on a particular operation or task. Network users may be operators or operational service providers who may control daily operations, serve application content, make payroll, etc. When a network disruption is reported, it is desirable for users to get an assessment of impact to operational and support processes. For example, users may want to know how does a router outage affect the ability to control a satellite, access web application content, to deliver payroll, etc. Thus, it is desirable to get reports of network disruption and/or analysis in terms of impact on a mission or task.

Using conventional systems, once a disruption becomes symptomatic, network operations personnel manually translate network performance data into mission dependencies and then mission impact information that can be relayed up the network user's chain. However, this process can be inefficient and impracticable. The network operations center usually will not know all of the operational and support missions that depend on any particular link or node that is disrupted. So unless the disruption happens to turn off a critical user process and that user manually notifies the network operations center, they can only report the disruption in network terms. Problems with a redundancy link or node often go unnoticed or unreported. The interdependence of multiple user processes and the innate interdependence of modern networks make complete assessments very difficult. Gathering, translating, correlating and formatting assessments is very time consuming and is often not timely enough to enable effective mitigation procedures.

Moreover, conventional network management applications typically do not automatically report network problems directly in mission impact terminology. Many of these application are unable to handle the complex intricacies of today's networks and/or systems.

SUMMARY OF THE INVENTION

An embodiment of the present invention may provide a method and system for event notification and/or risk assessment based on mission impact that may be due to actual and/or potential info-structure disruptions. In one embodiment of the present invention, one or more network event messages may be received from a source. An operational mission impacted by an network event may be identified based on a received network event message and mapping with an operational architecture task identifier associated with the impacted operational mission and an element identifier associated with a source element.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

An embodiment of the present invention may provide event notification and/or risk assessment based on operational impact of actual and/or potential info-structure disruptions.

Figure 1:
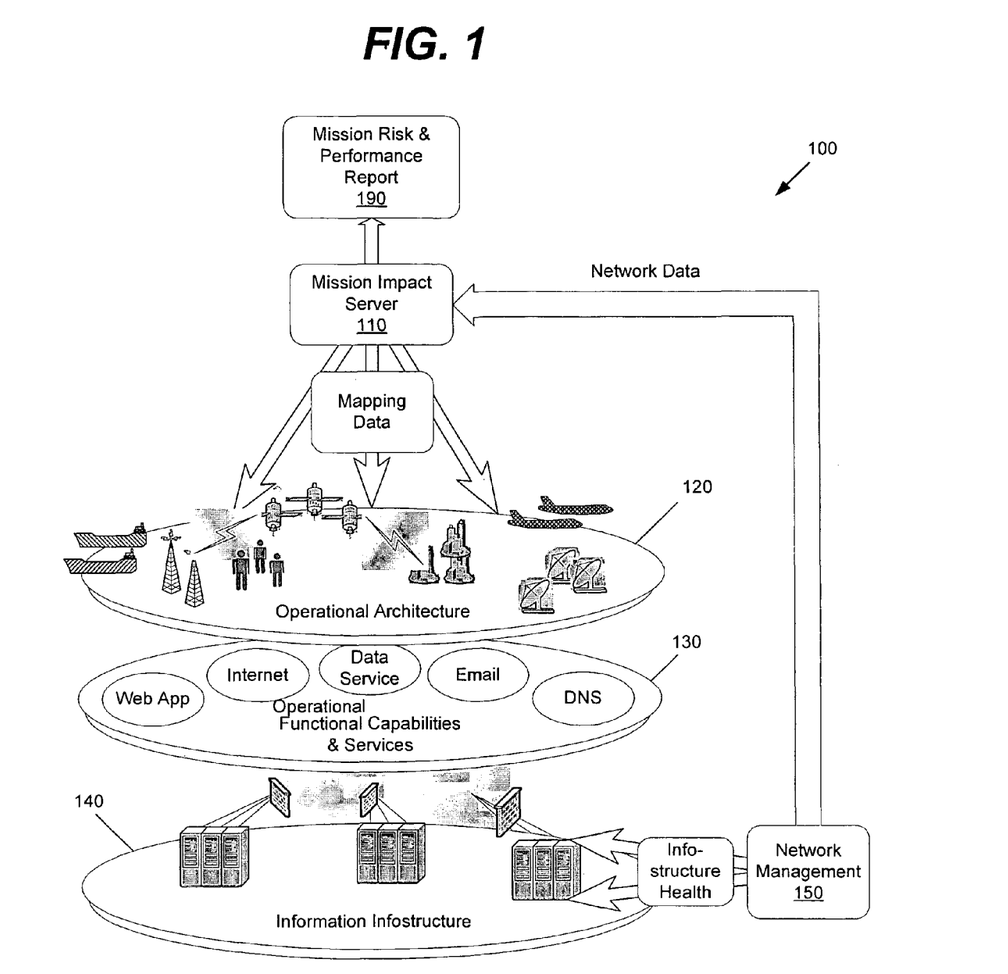
FIG. 1 is a system diagram in accordance with an embodiment of the present invention.

FIG. 1 is a system 100 in accordance with an embodiment of the present invention. As shown in FIG. 1, system 100 may include an information info-structure 140 that may support a plurality of functional capabilities and/or services 130. The services 130 and/or the info-structure 140 may provide the underlying infrastructure to support the operational architecture 120.

In one embodiment of the present invention, the info-structure 140 may be monitored by a network management sub-system 150. The network management sub-system 150 may include a commercial-off-the-shelf (COTS) network management software package such as Hewlett Packard's OpenView Network Node Manager, HP OpenView Operations, Smarts InCharge, Managed Objects Formula and the like. It may be possible to receive a feed from a Manager of Managers (MOM) such as HP Openview, Netcool, Calif. Unicenter and the like.

The network management sub-system 150 may retrieve network health and/or status information from the info-structure 140. The network management sub-system 150 may provide the health and/or status information to a mission impact server (MIS) 110, in accordance with an embodiment of the present invention. In an embodiment of the present invention, data associated with the services 130 and/or operational architecture 120 may also be provided to the MIS 110 for processing and/or logging.

In accordance with an embodiment of the present invention, the MIS 110 may receive the info-structure health and/or status information and using mapping data such as network to mission mapping data, the MIS 110 may generate mission risk and/or performance reports 190. The mission risk and/or performance reports may include not only operational status of current applications and/or tasks but also may include risk assessments associated with these applications or tasks. Details of the MIS 110 and/or reports 190 will be described below in more detail.

As used herein, the term "info-structure" may include, for example, shared computers, ancillary equipment, software, firmware and related procedures, services, people, and other resources used in the acquisition, storage, manipulation, protection, management, movement, control, display, switching, interchange, transmission, or reception of data or information in any format including audio, video, imagery, or data, whether supporting information technology, national security systems, communication systems, power grid systems or any other network or system.

In one embodiment of the present invention, the info-structure 140 may include a transit network which may be a communications network that may include, for example, a public switched telephone network (PSTN), an Integrated Services Digital Network (ISDN), a cellular network, a digital mobile network, a Personal Communication Systems (PCS) network, an Internet, an intranet, a signaling system 7 (SS7) network, a local area network (LAN), a satellite network, an advance intelligent network (AIN), any suitable digital or analog network, a broadband network such as a cable network, any other suitable national and/or international communications network or any suitable combination thereof.

The transit network may include a plurality of switches, communication interfaces, and/or other components that are not shown for convenience. It is recognized that the communications that may be provided may include hard-line, wireless, RF, optical, or any other type of communications or any combination thereof. The various devices, systems, networks, etc. may be appropriately configured or equipped with hardware and/or software to operate in such environments.

The functional services 130 supported by the info-structure 140 may include, for example, Internet, web application, domain name system (DNS), E-mail, data and/or any other type of services used to perform an operational task. It is recognized that other type of functional services such as services relating to a power grid, data/voice communications network, cable network, etc. may be provided in an embodiment of the present invention.

In an embodiment of the present invention, the operational architecture 120 may include, for example, the mission infrastructure that uses the one or more functional services 130 to accomplish one or more tasks or missions. Missions or tasks that may be supported by the underlying info-structure 140 and/or services 130 may include, for example, processing payroll, delivering products and/or services, conducting military exercises and/or missions, and/or a myriad of other tasks or missions. It is recognized that a mission may include a plurality of tasks that may need to be completed in order to complete the mission.

Figure 2:
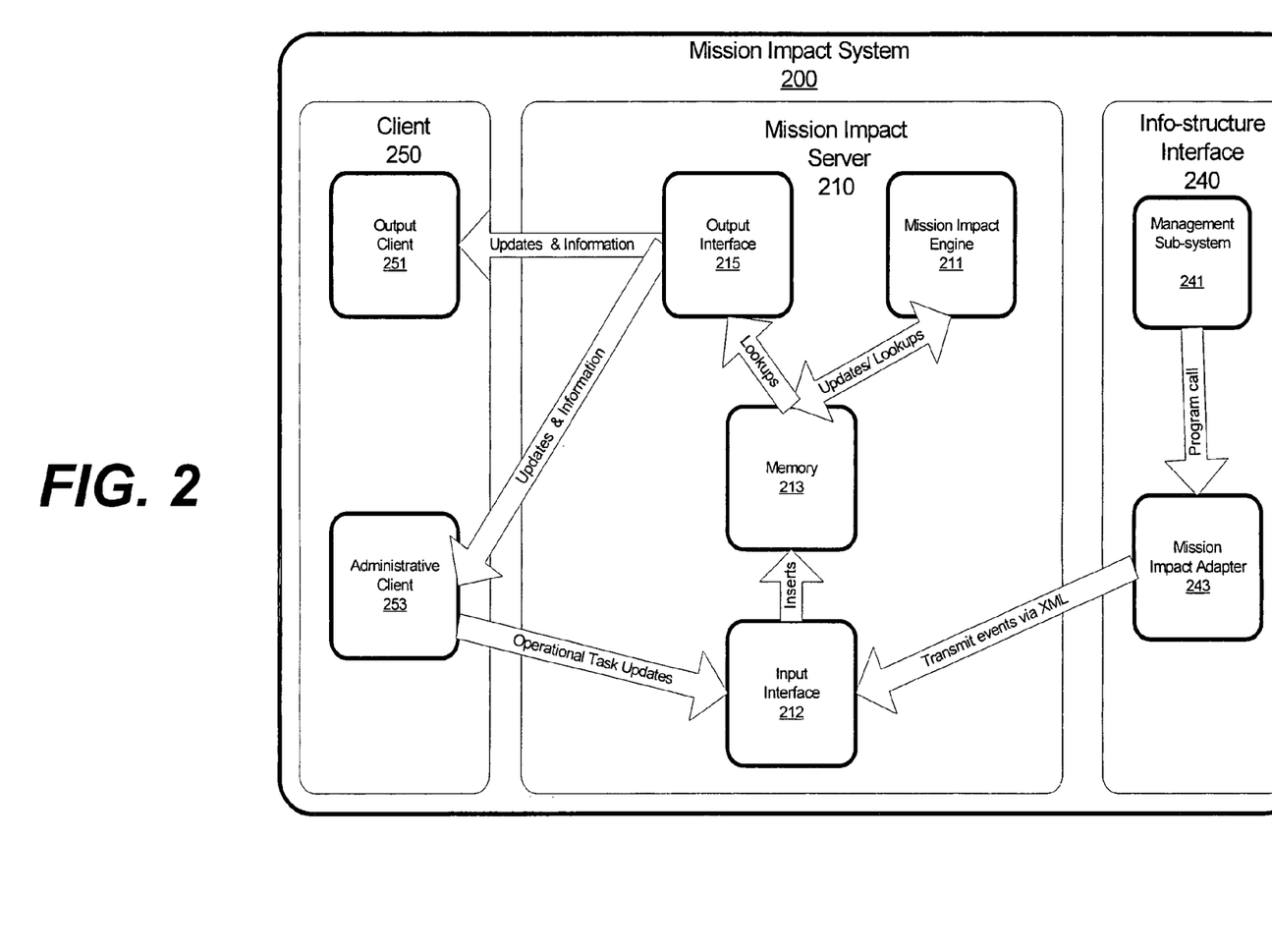
FIG. 2 illustrates a block diagram of an system in accordance with an embodiment of the present invention.

FIG. 2 is a block diagram of a mission impact system 200 in accordance with an embodiment of the present invention. The mission impact system 200 may include, for example, a info-structure data interface 240, a mission impact server (MIS) 210 and one or more clients 250. The info-structure data interface 240, the MIS 210 and one or more clients 250 may be operationally coupled to one another to, for example, exchange data.

In an embodiment of the present invention, the info-structure data interface 240 may include a management sub-system 241 to, for example, monitor and collect health and/or status data from the info-structure such as info-structure 140. As described above with respect to sub-system 150, the network management sub-system 241 may include a commercial-off-the-shelf (COTS) network management software package such as Hewlett Packard's OpenView Network Node Manager, HP OpenView Operations, Smarts InCharge, Managed Objects Formula, custom monitoring products, and/or Manager of Manager (MOM) products. The data from the sub-system 241 may be delivered directly to the MIS 210 or may pass through one or more mission impact adapters 243. The one or more adapters may process the information about the status and/or health of the info-structure 140 by, for example, formatting the data so that it can be delivered to the MIS 210. The info-structure data may include one or more event messages, data throughput information, or the like. Each of the messages, for example, may be translated into a standard data format and may be transmitted to the MIS 210 via XML (eXtensible Markup Language), for example. It is recognized that XML is given by way of example only and that any other type of format and/or language may be used to process and/or transmit data.

In an embodiment of the present invention, the MIS 210 may include an input interface 212, a memory 213, a mission impact engine (MIE) 211 and/or an output interface 215, for example. It is recognized that MIS 210 may include additional components and/or software. The input interface 212 may receive all event and/or status information from, for example, info-structure interface 240 and/or any other device. The input interface 212 may process the data as needed for use by the MIS 210. The input interface 212 may parse the data, prioritize the data and/or place the data in to a priority queue that may be incorporated into the memory 213. The priority may be established so that, for example, in the case of multiple events arriving simultaneously, the most important events may be processed first. The priority may be established by the MIS 210, info-structure interface 240, the info-structure 140 and/or by other means. Thresholds may be established to determine the event priority. For example, higher priority may be given to event messages that are above a certain established threshold while lower priority may be given to event messages that are below a certain threshold or vice versa.

The memory 213 may be used to store data associated with the mission impact system 200. The data may be current data as well as prior data associated with past events and/or status history. The MIE 211 as well as the output interface 215 may access the memory 213 to retrieve data so that the most current and/or coherent data is accessed. The memory 213 may be any type of memory such as a volatile or non-volatile memory. Although only a single memory is shown, the MIS 210 may include more than one memory. The data in memory 213 may be stored and/or accessed based on priority as described above.

In an embodiment of the present invention, the MIE 211 may retrieve the data from the memory 213 and may process the events according to priority, for example. For example, as events arrive in the memory queue they may be processed based on their priority relative to the other events currently in the queue. The mission impact of each event, for example, may be determined by the MIE 211 and mission impact information may be stored or logged in memory 213 and/or may be provided to the output interface 215 and/or to the client directly, for example.

In an embodiment of the present invention, the MIE 211 may receive updates related to event messages, status information and/or any other information related to the health and/or status of system 100 from the memory 213. In an embodiment of the present invention, for example, as data associated with system 100 is received, the MIE 211 may generate mapping data to relate, for example, an event message received to one or more components or elements associated with the operational architecture 120, services 130 and/or information info-structure 140. It is recognized that this mapping can be done in advance of receiving the event messages, as the messages are received, and/or any combination thereof.

In an embodiment of the present invention, one or more info-structure 140 components may be mapped or associated with a service 130 component or operational architecture 120 component. Additionally, operational architecture 120 components may be mapped to other operational 120 components and/or service 130 components may be mapped to other service 130 components. These associations may be used by the MIS 210 to determine calculation metrics used in impact assessments, for example, performance and/or risk. For example, the calculation metrics may be based on info-structure 140 component connectivity, reliability, redundancy, and/or vulnerabilities of mapped info-structure 140 components and/or intermediary info-structure 140 components. It is recognized that the given calculation metrics are given as examples only and other calculation metrics may be used by the MIS 210 to determine impact assessments.

Figure 3:
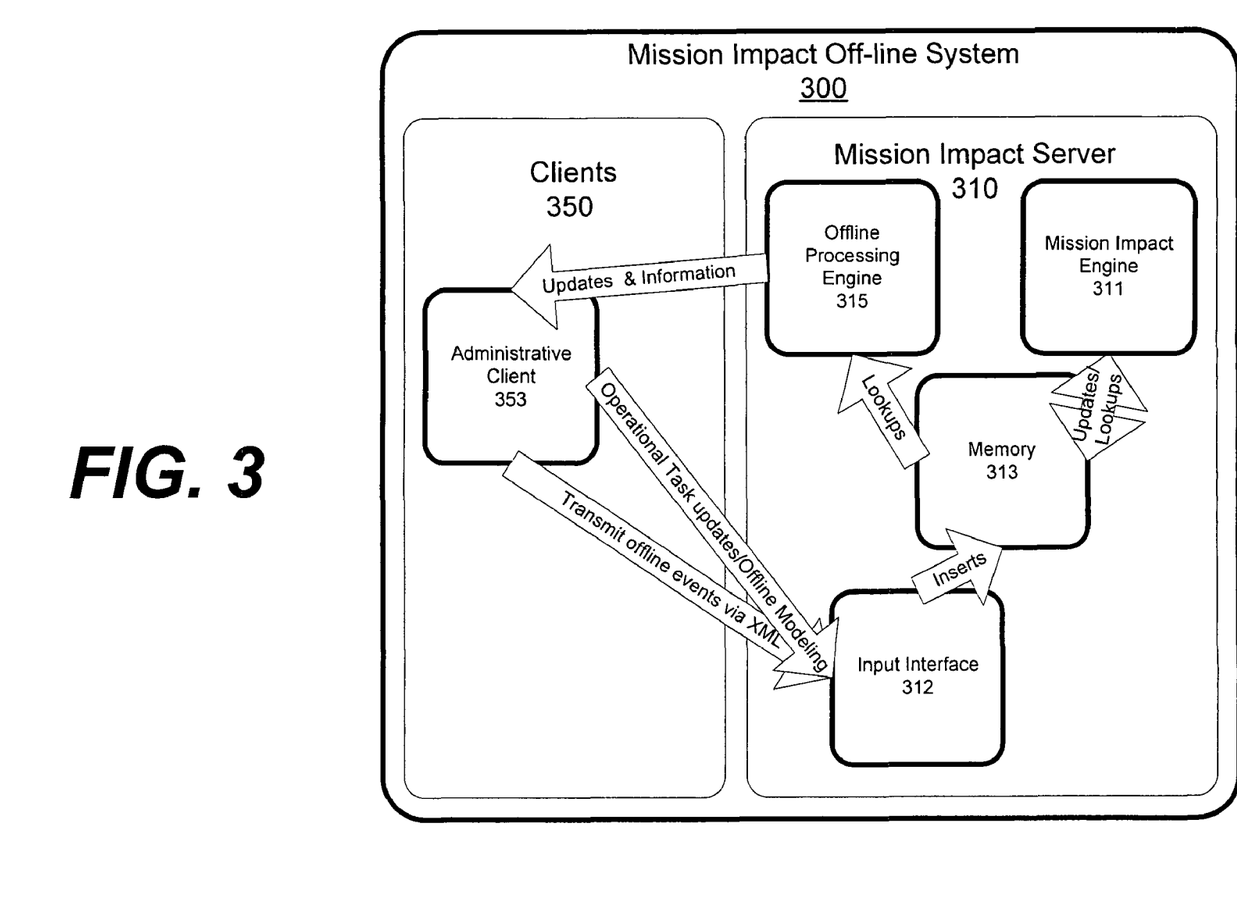
FIG. 3 is a block diagram of a system in accordance with another embodiment of the present invention.

In an embodiment of the present invention, one or more network event messages may be received from a source. The one or more network messages may be associated with a component and/or interface that is impacted. The component may be impacted because of a network event, for example, or based on a simulation associated with offline analysis. In an embodiment of the present invention, various mapping data may be maintained by components of the mission server 210 and/or 310. For example, one or more source element identifiers may be mapped with one or more network event messages. The source element identifier may be associated with a network info-structure component such as a link, interface, card, device, module, etc. The network info-structure component may be impacted due to a network event or an offline analysis simulation, for example. Based on the received network event message, an associated source element identifier may be identified using the mapping data.

In an embodiment of the present invention, mapping between one or more source element identifiers with one or more corresponding service interface identifiers may be used to identify a service interface identifier associated with the source element identifier associated with the received network event message. Mapping between one or more service interface identifiers and one or more operational task identifiers associated with an operational mission may be used to identify the operational mission impacted based on the identified service interface identifier. It is recognized that the operational mission impact may be due to a network event or may provide a possible impact scenario based on offline analysis simulations. In accordance with an embodiment of the present invention, identification of the operational mission impact can be made based on the received network event message.

In an embodiment of the present invention, a network event message may be generated if a performance value associated with a network info-structure component reaches a pre-determined performance threshold level. This performance value may measure a link throughput, a card, component and/or device performance level, and/or any other information. It is recognized that a risk value associated with a network info-structure component may also be monitored to determine if a risk level threshold has been exceeded. If a risk level threshold has been exceeded, for example, a network event message may be generated. In an embodiment of the present invention, the performance value, risk values and/or threshold values may be used to prioritize the received network events. Optionally or additionally, the MIS 210 may use the priority information to process the network event messages.

In an embodiment of the present invention, the output interface 215 may retrieve data from memory 213 and may transmit the data to one or more clients 250. As the clients 250 are loaded, the output interface 215 may forward, for example, mission impact data and/or risk assessment data to the clients. The output interface 215 may transmit data as updates are received and/or on a periodic basis.

In an embodiment of the present invention, clients 250 may include an output client 251 and/or may include an administrative client 253. The output client may be used for presenting the current state of operations, as well as showing changes or updates that occur on the system, for example. The output client 251 may provide an input interface for acknowledging changes, viewing root causes associated with network events and/or for viewing course of action to take for events. The administrative client 253 may provide all the features of the output client 251 and may include the additional abilities that permit a user to update enterprise services and/or operational architecture, for example. In addition, the administrative client 253 may also provide the ability to do offline modeling and/or simulation. It is recognized that although multiple clients are shown, the features described with respect to clients 251 and 253 may be incorporated into a single client or may be distributed among additional clients.

FIG. 3 is a block diagram of an off-line mission impact system 300 in accordance with an embodiment of the present invention. The off-line mission impact system 300 may include, for example, a mission impact server (MIS) 310 and one or more clients 350. The MIS 310 and one or more clients 350 may be operationally coupled to one another to, for example, exchange data.

In an embodiment of the present invention, the MIS 110 may include an input interface 312, a memory 313, a mission impact engine (MIE) 311 and/or an output interface 315, for example. It is recognized that MIS 210 may include additional components and/or software. It is recognized that the MIS 310 may include the functionality as described above with respect to MIS 210 as well as additional functionality as described herein.

In an embodiment of the present invention, client 350 may include an administrative client 353 that may output the current state of operations, as well as showing changes or updates that occur on the system, for example. The administrative client may provide an input interface for acknowledging changes, viewing root causes associated with network events and/or for viewing course of action to take for events. In addition, the administrative client 353 may permit a user to update the information info-structure architecture, enterprise services and/or operational architecture as well as provide the ability to do offline modeling and/or simulation. The administrative client 353 may, for example, transmit offline events to the MIS 310 via, for example, XML.

Although a plurality of components are shown in FIGS. 2 and 3, it is recognized that the functionality provided by the MIS 200 and MIS 300 may be provided by, for example, a single component. It is recognized that different parts of the server can be run on different boxes or components. Although, two separate systems are shown as "on-line" mode and an "off-line" mode, it is recognized that a single server can handle both modes of operation. In this case, the administrative client may generate all events during an offline mode, whereas during the online mode the monitoring systems may generate events for network components.

It is recognized that an embodiment of the invention may include, for example, components such as processors, computer readable memories, data ports or other interfaces, network ports or other interfaces, data buses and/or other hardware and/or software components (omitted). The data ports or other interfaces may permit the various devices to communicate with other devices and/or with the transit network and/or information info-structure. The data buses may connect the processor, the computer readable memory, the data port or other interface and/or the network port or other interface and may permit communications between the various components in an embodiment of the invention.

In an embodiment of the present invention, the MIE, for example, may process many "rules" or database triggers and thresholds to generate accurate assessments when processing event data. These rules may require scripts that may be altered according to contextual changes in the situation surrounding any network disruptions, for example. For example, if a payroll process is impacted by a link or node problem, the assessment that payroll cannot be made on time may depend on the operational context, on backup methods, backup links and nodes, etc. The relationship and/or mapping between mission impact and a network event may be accomplished using scripts and/or rules. The mapping and/or relationship may be established by an enterprise info-structure topology with a detailed operational architecture, for example.

In an embodiment of the present invention, the MIS may output, for example, assessment of the impact of an info-structure disruption on operational tasks. The MIS of the present invention generates dependencies of the operational tasks to the relevant components of the info-structure to deliver operational impact assessments. The dependencies may define critical paths and allow the MIS to calculate performance and/or risk metrics through impact assessment. In an embodiment of the present invention, the dependencies may be multi-dimensional. One or more operational tasks may have inter-dependencies as well as dependencies on other internal and external factors. One embodiment of the present invention may measure the risk that a disastrous chain of events may come to pass if the dependence relationships are adequately mapped.

As described herein, the operational impact assessment of the MIS may be comprised of two parts: performance and risk. The performance impact assessment may include a qualitative description of the impact on an operational task and a quantitative description of the degradation of associated performance metrics. The risk assessment may provide a confidence level that performance will continue to meet expectations.

In an embodiment of the present invention, the factors used to calculate an operational impact assessment may include, for example, an operation task mapping, a prioritized list of operational tasks, performance metrics from standard enterprise management systems and/or info-structure component attributes which may be responsive to the dynamic real world and business environment. Mission Impact System 200 may provide a customizable rule set that may automate the relative importance of all appropriate factors that go into making a relevant, timely, and accurate assessment.

An embodiment of the present invention may provide mission mapping which may include the process of uniformly defining, prioritizing, and storing operational tasks and identifying the info-structure dependencies of certain communications paths. Prioritization may be provided by tracking and accounting for the changing priorities of an enterprise operational architecture based on internal and external environmental variables. The root cause events may be co-related with operational task critical paths. Risk assessment may also be provided based on the calculation of confidence factors that performance will continue to meet expectations based on critical path redundancy and/or reliability. Impact analysis reporting may be based on the delivery of operational impact assessments based on operational task correlation and risk assessment in various levels of detail.

Moreover, a course of action analysis may provide a set of recommendations based on user projections and/or possible collateral implications of each decision. Exception analysis based on the process of changing the natural behavior of the MIS scheduled events may also be provided as well as offline modeling based on performing off-line analysis for course of action scenario testing.

Figure 4:
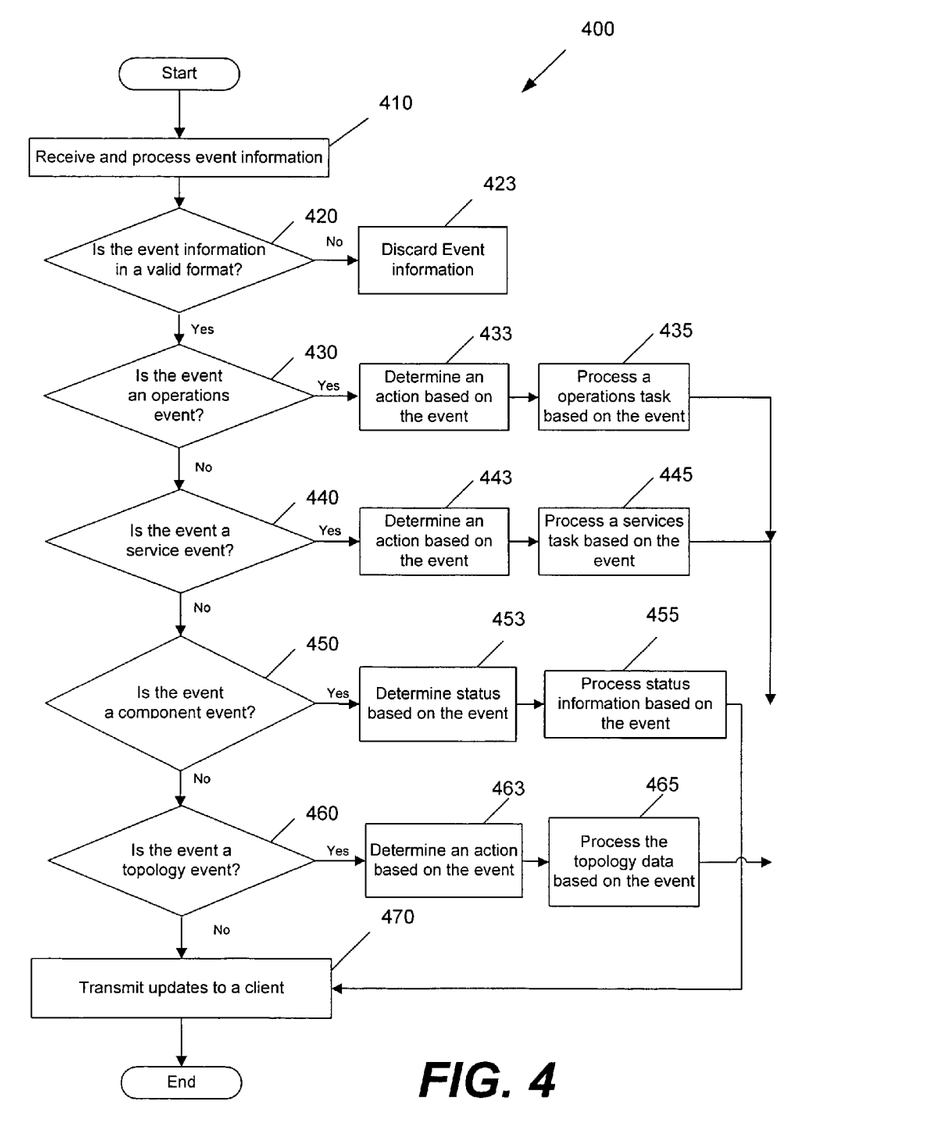
FIG. 4 is flowchart illustrating a method in accordance with an embodiment of the present invention.

FIG. 4 is a flowchart illustrating a method 400 in accordance with an embodiment of the present invention. Event processing may occur in the MIS 210, 310 and/or may occur in any other component of the mission impact system, in accordance with an embodiment of the present invention. An event notification including information associated with the event may be received by the MIS 210 and/or 310, as shown in box 410. In an embodiment of the present invention, the event may be a network event such as a communication link that is down and/or a device or component that has failed, and/or any other type of event that may impact a current and/or future mission, for example.

Initially, it may be determined whether the received event information is in a valid format, as shown in box 420. For example, if the received event is formatted in XML, it should conform to the appropriate XML document type definition (DTD) associated with the type of event being received. If the event information is not in the valid format, the event information may be discarded, as shown in boxes 420 and 423. In an embodiment of the present invention, the MIS 210 and/or MIS 310 may, for example, send a request to the info-structure interface 240 to resend the event information. In addition, the MIS 210 and/or MIS 310 may provide a suggested format for the event information to the interface 240.

In an embodiment of the present invention, if the event information is in a valid format, the event information may be processed as shown in FIG. 4. If the event is an operations event, an action may be determined based on the event information, as shown in boxes 430 and 433. The action may include processing an operations task, as shown in box 435. For example, if an operational task has been added, the task information may be added to the memory. If the task has been removed, associated dependencies may be found and removed and the task may be removed from the memory. The metrics for the associated task may be re-calculated. If the task is moved hierarchically, the task may be moved in the memory and the metrics associated with the hierarchical parents may be recalculated. The memory may be updated to reflect the move and the old and new hierarchical parents' metrics may be recalculated.

If an inter-task dependence has been added, a check for dependence loops may be made. If a dependence loop exists, the new dependence may be rejected. If a loop does not exist, a dependence in the data source may be created and the metrics for affected tasks of new dependencies may be recalculated. If the inter-task dependence has been removed, then the inter-task dependence may be removed from the data source and the metrics associated with the affected task of removed dependence may be recalculated. If an operational task to service dependence is added and if the needed service communication exists, the dependence may be added to the memory and the associated task metrics may be recalculated. If an operational task to service dependence is added and if the needed service communication does not exist, the needed service communication may be added, and the dependence may be added to the memory and the associated task metrics may be recalculated. If, on the other hand, the operational task-to-service dependence is removed, the dependence may be removed from the data source and the associated task metrics may be recalculated.

As shown in box 440, if the event is a service event, an action may be determined based on the event information, as shown in boxes 440 and 443. The action may include processing a service task, as shown in box 445. For example, if a service has been added, the service may be added into the memory. If a service is removed, communications dependencies that use the service may be analyzed and removed. The metrics for the affected task and/or service may be recalculated and the service may be removed from the memory. If the service is moved hierarchically and if parent associations exist, component paths may be deleted from parent communications tables. The parent metrics may be recalculated. If parent associations do not exist, the memory may be updated to reflect the service move and new parent associations may be checked. If new parent associations exist, component paths may be added for the service to parent communication tables. The parent's metrics may be recalculated.

In an embodiment of the present invention, if an inter-service dependence has been added, a check for dependence loops may be made. If a dependence loop exists, the new dependence may be rejected. If a loop does not exist, a check for a matching service communication may be made. If the matching service communication exists, a dependence may be created and related to the communications. The metrics for affected operational task to service of new dependencies may be recalculated. If the matching service communication does not exist, the service communication may be created and a dependence may be created and related to the communications. The metrics for affected operational task to service dependencies may be recalculated.

If the inter-service dependence has been removed, then the inter-service dependence may be removed from the memory and the metrics associated with the affected operational task to service dependence may be recalculated.

If a component has been added to the service, paths may be added to existing communications and the communications metrics and operational task to service dependencies may be re-calculated. If a component has been removed from a service, paths may be removed from existing communications and the communications metrics and operational task to service dependencies may be re-calculated.

If the event is a component event, then the component status may be determined based on the event, as shown in boxes 450 and 453. An action may be executed with respect to the impacted component and/or interface, as shown in box 455. For example, if the component is determined to be up, the component may be set as active in the memory. If an interface is determined to be up, the interface may be set as active in the data source. In either case, the component and/or interface listing may be removed from an impacted path listing. If the component is determined to be down, the component may be set as in-active in the memory. If an interface is determined to be down, the interface may be set as in-active in the memory. In either case, the down component and/or interface listing may be added to an impacted path listing. The metrics for affected paths/service connections and the affected task metrics may be recalculated for the change in component and/or interface.

In an embodiment of the present invention, if based on the received event information, it is determined that the event is a topology event, then an action maybe executed based on the event, as shown in boxes 460 and 463. As shown in box 465, topology related information may be processed based on the event information. For example, if a component and/or connection is added to memory and helpful paths are found, affected services and/or tasks may be recalculated. If, on the other hand, a component and/or connection is removed, the component and/or connection may be removed from the memory and the affected paths and/or service may be removed.

As shown in box 470, updates associated with the processed event data, as described herein, may be transmitted to a client.

An embodiment of the present invention includes a method in which one or more network event messages may be received from a source. An operational mission impacted by an network event may be identified based on a received network event message and mapping with an operational architecture task identifier associated with the impacted operational mission and an element identifier associated with a source element. In another embodiment of the present invention, the one or more received network event messages may be queued based on priority.

In one embodiment of the present invention, the priority may be based on a pre-determined performance level and/or a pre-determined risk level. The source element may be associated with an info-structure component having a performance value below a predetermined threshold. Optionally or additionally, the source element may be associated with an info-structure component having a risk assessment value above a predetermined threshold. In an embodiment of the present invention, the source element may associated with an interface and/or a node. The element identifier may be mapped with a corresponding service interface identifier. The service interface identifier may be mapped with one or more operational task identifiers associated with an operational task. The service interface identifier may be mapped with one or more operational mission identifiers associated with the impacted operational mission.

In an embodiment of the present invention, a report identifying the source element that caused the network event may be generated. In an embodiment of the present invention, the source may be part of a telecommunications network, an information technology network, a power grid network, or any other communications network, for example.

An embodiment of the present invention may provide a method for receiving one or more network event messages from a source. A source element identifier may be mapped with a received network event message from the one or more network event messages received. The source element identifier may be mapped with a corresponding service interface identifier. The service interface identifier may be mapped with one or more operational task identifiers associated with an operational mission. An operational mission impacted by a network event may be identified based on the received network event message, and the mapping of the service interface identifier with the one or more operational task identifiers, the mapping of the source element identifier with the corresponding service interface identifier and the mapping of the source element identifier with the received network event message.

In an embodiment, the source element identifier is associated with a network info-structure component. The network event message may be generated if a performance value associated with a network info-structure component reaches a pre-determined performance threshold level. Optionally or additionally, the network event message may be generated if a risk value associated with a network info-structure component reaches a pre-determined risk threshold level. The one or more network event messages may be prioritized based on a pre-determined threshold value.

An embodiment of the present invention may provide a network server. The network server may include a receiver to receive one or more network event messages from a source; an event processor to identify an operational mission impacted by a network event based on a received network event message and mapping with an operational architecture task identifier associated with the impacted operational mission and an element identifier associated with a source element.

The network server may further include a buffer to queue the one or more received network event messages based on priority. The source element may be associated with an interface and/or a node.

The event processor may map the element identifier with a corresponding service interface identifier. In embodiments of the present invention, the event processor may map the service interface identifier with one or more operational task identifiers associated with an operational task. The event processor may map the service interface identifier with one or more operational mission identifiers associated with the impacted operational mission. The output interface may generate a report to identify the source element that caused a network event.

An embodiment of the present invention may include a network management system. The network management system may include a network management server to receive an event message associated with a network event and to identify an operational task that has been impacted as a result of the network event based on mapping between an identifier associated with the operational task and the event message; and a client terminal coupled to the network management server, wherein the network management server to identifies a network info-structure component associated with the event message and to output the identity of the network info-structure component to the client terminal.

In an embodiment of the present invention, the system may further include a transmitter associated with a network info-structure component to transmit the event message to the network management server.

An embodiment of the present invention provides a method and system for event notification and/or risk assessment based on mission impact that may be due to actual and/or potential info-structure disruptions. In one embodiment of the present invention, one or more network event messages may be received from a source. An operational mission impacted by an network event may be identified based on a received network event message and mapping with an operational architecture task identifier associated with the impacted operational mission and an element identifier associated with a source element.

Several embodiments of the present invention are specifically illustrated and/or described herein. However, it will be appreciated that modifications and variations of the present invention are covered by the above teachings and within the purview of the appended claims without departing from the spirit and intended scope of the invention.

The invention claimed is:

1. A method comprising:
   receiving one or more network event messages from a source;
   identifying an operational mission impacted by a network event based on a received network event message, mapping with an operational architecture task identifier associated with the impacted operational mission and mapping with an element identifier associated with a source element, wherein the operational mission is a military exercises or military mission.

2. The method of claim 1, further comprising: queuing the one or more received network event messages based on priority.

3. The method of claim 2, wherein priority is based on a pre-determined potential for operational impact based on a change in performance.

4. The method of claim 2, wherein priority is based on a pre-determined potential for operational impact based on a change in risk.

5. The method of claim 1, wherein the source element is associated with an info-structure component having a performance value above or below a predetermined threshold.

6. The method of claim 1, wherein the source element is associated with an info-structure component having a risk assessment value above or below a predetermined threshold.

7. The method of claim 1, wherein the source element is associated with an interface.

8. The method of claim 1, wherein the source element is associated with a node.

9. The method of claim 1, further comprising: mapping the element identifier with a corresponding service interface identifier.

10. The method of claim 9, further comprising: mapping the service interface identifier with one or more operational task identifiers associated with an operational task.

11. The method of claim 9, further comprising: mapping the service interface identifier with one or more operational mission identifiers associated with the impacted operational mission.

12. The method of claim 1, further comprising: generating a report identifying the source element that caused the network event.

13. The method of claim 1, wherein the source is part of a telecommunications network.

14. The method of claim 1, wherein the source is part of an information technology network.

15. The method of claim 1, wherein the source is part of a power grid network.

16. A method monitoring a network comprising:
    receiving one or more network event messages from a source;
    mapping a source element identifier with a received network event message from the one or more network event messages received;
    mapping the source element identifier with a corresponding service interface identifier;
    mapping the service interface identifier with one or more operational task identifiers associated with an operational mission; and
    identifying an operational mission impacted by a network event based on the received network event message, and the mapping of the service interface identifier with the one or more operational task identifiers, the mapping of the source element identifier with the corresponding service interface identifier and the mapping of the source element identifier with the received network event message, wherein the operational mission is a military exercises or military mission.

17. The method of claim 16, wherein the source element identifier is associated with a network info-structure component.

18. The method of claim 16, further comprising: generating the network event message if a performance value associated with a network info-structure component reaches a pre-determined performance threshold level.

19. The method of claim 16, further comprising: generating the network event message if a risk value associated with a network info-structure component reaches a pre-determined risk threshold level.

20. The method of claim 16, further comprising: prioritizing the one or more network event messages based on a pre-determined threshold value.

21. A network server comprising:
a receiver to receive one or more network event messages from a source; and
an event processor to identify an operational mission impacted by a network event based on a received network event message, mapping with an operational architecture task identifier associated with the impacted operational mission and mapping with an element identifier associated with a source element, wherein the operational mission is a military exercises or military mission.

22. The network server of claim 21, further comprising: a buffer to queue the one or more received network event messages based on priority.

23. The network server of claim 21, wherein the source element is associated with an interface.

24. The network server of claim 21, wherein the source element is associated with a node.

25. The network server of claim 21, wherein the event processor is to map the element identifier with a corresponding service interface identifier.

26. The network server of claim 21, wherein the event processor is to map the service interface identifier with one or more operational task identifiers associated with an operational task.

27. The network server of claim 21, wherein the event processor is to map the service interface identifier with one or more operational mission identifiers associated with the impacted operational mission.

28. The network server of claim 21, further comprising: an output interface to generate a report to identify the source element that caused a network event.

29. A network management system, comprising:
a network management server to receive an event message associated with a network event and to identify an operational task that has been impacted as a result of the network event based on mapping between an identifier associated with the operational task and the event message, wherein the operational task is a military exercises or military mission; and
a client terminal coupled to the network management server, wherein the network management server identifies a network info-structure component associated with the event message and outputs the identity of the network info-structure component to the client terminal.

30. The system of claim 29, further comprising: a transmitter associated with a network info-structure component to transmit the event message to the network management server.

* * * * *